Patented Sept. 29, 1942

2,297,671

UNITED STATES PATENT OFFICE 2,297,671

PROCESS OF PREPARING GROWTH PROMOTING VITAMIN $B_2$ (VITAMIN G) BY FERMENTATION

Izue Yamasaki, Fukuoka, Japan; vested in the Alien Property Custodian

No Drawing. Application October 10, 1938, Serial No. 234,290. In Japan February 9, 1938

4 Claims. (Cl. 195—42)

This invention relates to a process of preparing growth promoting vitamin $B_2$ (vitamin G) by fermentation of a vegetable and other fermentable mash with an acetone-butylalcohol bacteria in condition of adding a fermentation modifying agent in the period from the beginning to the midst of fermentation. Cereal mash made from one of the group of rice, barley, wheat, naked barley, rye, oat, maize, millet and sorghum, carbohydrate containing yeast water and whey may be preferably used as the fermentation medium. An inorganic agent such as calcium carbonate or an organic agent such as calcium acetate may be used as the fermentation modifying agent.

For instance, one of the above named cereals is powdered and steamed with water so as to make a 4 to 8% mash. The mash thus made or any other fermentation medium mentioned above is sterilized by heating it one or two hours under a pressure of 20 to 30 pounds per square inch, and cooled down to about 37 to 40° C. A pure culture of acetone-butylalcohol bacteria such as Clostridium acetobutylicum or of Granulobacter pectinovorum is inoculated to the mash and thereby pure fermentation is carried on about 48 to 72 hours at about 37° C. At the beginning of fermentation, about 0.1 to 2.0%, based on the mash, of sterilized calcium carbonate or about the same percentage of calcium acetate is added thereto. By this means, the normal course of acetone-butylalcohol production is remarkably checked and this leads to a new type of fermentation resulting in the production of a strong yellow and yellowish green fluorescent pigment in the fermenting liquid. The yellow pigment thus produced is the chief factor, that is, flavin, of the growth promoting vitamin $B_2$ complex.

This yellow liquid may be filtered and condensed in a smaller volume at low temperature in the absence of light, purified by treating it with ethyl alcohol or acetone, and further condensed until it becomes syrupy liquid, which can be used directly as concentrate of vitamin $B_2$. This vitamin $B_2$ concentrate may be purified by any adsorption method until practically pure vitamin $B_2$ in a crystalline state is obtained.

The yield of vitamin $B_2$ according to the new process varies as the fermentation medium employed. The vitamin $B_2$ content is increased up to ten times or more in the case of yeast water or whey, and to thirty to fifty times in the case of cereal mashes of their original content. Therefore this invention enables us to prepare vitamin $B_2$ with remarkable industrial and economical effects.

The vitamin $B_2$ concentrate prepared according to the new process is quite agreeable both in smell and taste. It is soluble in water or alcohol containing water and produces fine yellow color and pretty yellowish green fluorescence. Therefore it may be used as such or by adding to other foods or drinks. Less than 50 $\gamma$ of the crystal per day per head promotes the normal growth of albino rats.

What I claim is:

1. A process of preparing growth promoting vitamin $B_2$ by fermentation of a fermentable carbohydrate mash, chosen from the class consisting of nutrient starchy mashes and nutrient sugar mashes, by means of acetone butylalcohol bacteria of the species Clostridium acetobutylicum (Weizmann) under condition of adding to the mash not less than 0.1% based on the mash of a fermentation modifying agent selected from the group consisting of calcium carbonate and calcium acetate at the early stage of fermentation.

2. A process of preparing growth promoting vitmain $B_2$ by fermentation of cereal mash made from one selected from the group consisting of nutrient starchy mashes and nutrient sugar mashes by means of acetone butylalcohol bacteria of the species Cl. acetobutylicum (Weizmann) under conditions of adding to the mash from 0.5 to 2.0%, based on the mash, of a calcium salt, selected from a class consisting of calcium carbonate and calcium acetate, in the early stage of fermentation between 0 to 7 hours after the inoculation.

3. A process of preparing growth promoting vitamin $B_2$ by fermentation of whey by means of acetone butylalcohol bacteria of the species Cl. acetobutylicum (Weizmann) under condition of adding to the mash from 0.5 to 2.0%, based on the mash, of a calcium salt, selected from a class consisting of calcium carbonate and calcium acetate, in the early stage of fermentation between 0 to 7 hours after the inoculation.

4. A process of preparing growth promoting vitamin $B_2$ by fermentation of yeast water, to which about 3% of fermentable carbohydrate has been added, by means of acetone butylalcohol bacteria of the species Cl. acetobutylicum (Weizmann) under condition of adding to the mash more than 0.1% based on the mash of a calcium salt, selected from a class consisting of calcium carbonate and calcium acetate, in the early stage of fermentation between 0 to 7 hours after the inoculation.

IZUE YAMASAKI.